Figure 1:
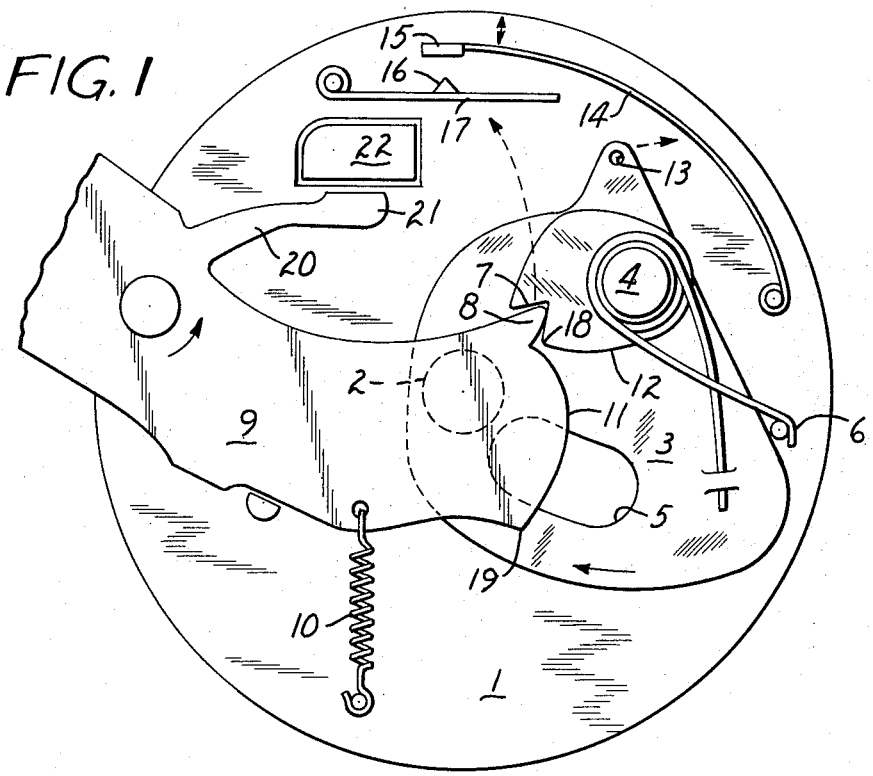
Figure 2:
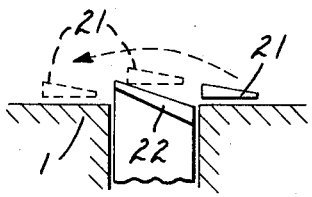
Figure 3:
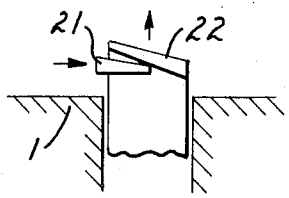

United States Patent [19]
Milanese et al.

[11] 3,709,127
[45] Jan. 9, 1973

[54] CAMERA SHUTTER

[75] Inventors: Vincenzo Milanese; Angelo Bianchi, both of Ceva, Italy

[73] Assignee: Ferrania S.p.A., Milan, Italy

[22] Filed: July 16, 1970

[21] Appl. No.: 62,759

Related U.S. Application Data

[62] Division of Ser. No. 736,2030, June 11, 1968, abandoned.

[30] Foreign Application Priority Data

June 14, 1967 Italy..................................37470 A/67

[52] U.S. Cl. ...................................95/31 FL, 95/60
[51] Int. Cl. ........................G03b 9/10, G03b 21/26
[58] Field of Search ...................95/31 FL, 59, 60

[56] References Cited

UNITED STATES PATENTS

| | | | |
|---|---|---|---|
| 2,909,976 | 10/1959 | Dearstyne | 95/59 X |
| 2,559,880 | 7/1951 | Kesel et al. | 95/31 FL |
| 2,514,669 | 7/1950 | Pribus | 95/59 |
| 2,051,225 | 8/1936 | Riddell | 95/59 X |
| 1,281,998 | 10/1918 | Parish | 95/59 X |

Primary Examiner—Joseph F. Peters, Jr.
Attorney—Kinney, Alexander, Sell, Steldt & Delahunt

[57] ABSTRACT

A camera shutter having electrical contact means for energizing flashbulbs and double exposure prevention means is shown.

2 Claims, 5 Drawing Figures

PATENTED JAN 9 1973

3,709,127

SHEET 1 OF 2

INVENTORS
VINCENZO MILANESE
ANGELO BIANCHI
BY Kinney, Alexander,
Sell, Steldt & DeLaHunt
ATTORNEYS

CAMERA SHUTTER

This application is a division of U.S. application, Ser. No. 736,203, filed June 11, 1968, now abandoned.

Camera shutters having flashbulb circuit closing devices and means for preventing double exposures usually are complex and expensive and hence are not desirable for use in low-cost cameras such as those designed to be returned after use to a processor who removes and develops exposed photographic film.

It is an object of the present invention to provide a simple camera shutter for use in low-cost cameras.

Another object of the present invention is to provide an inexpensive camera shutter having an electrical contact device for closing a flashbulb circuit and having a double exposure prevention device.

Briefly, the camera shutter of the present invention has a base member having a film-exposing aperture therethrough. A cocking lever which has a cocking position and a rest position is rotatably mounted to the base and is urged into the rest position by a first spring means. A recoil means, mounted on the base, bears one of a pair of normally opposed, spaced electrical contacts. A shutter blade adapted to engage and to be rotated by the cocking lever into a cocked position and to escape to a rest position under the pressure of a second spring means is rotatably mounted to the base to momentarily uncover the aperture therethrough upon escape of the shutter blade from the cocked position to the rest position. The shutter blade is provided with a biasing member adapted to bias the recoil means bearing one of the electrical contacts away from the other electrical contact during cocking of the shutter blade so that when the shutter blade is returned to its rest position, the recoil means bearing the one electrical contact springs back to permit momentary engagement of the electrical contacts.

The shutter device of the present invention may advantageously incorporate a double exposure prevention device which briefly comprises, with reference to the above-described camera shutter, a retractable blade member positioned adjacent the base and operatively coupled to retracting means within the camera which causes the retractable blade to be retracted towards the base when the camera is prepared for a film exposure. The cocking lever is provided with a plate member which is positioned to step over the upper surface of the retractable blade member when the cocking lever cocks the shutter blade and to pass between the retractable blade member and the base when the cocking lever returns to its rest position. When passing between the retractable blade member and the base, the plate member engages a lower camming surface of the retractable blade and cams the retractable blade away from the base into position to obstruct repassage of the plate member thereover when subsequent cocking of the shutter blade is attempted without retracting the retractable blade member by preparing the camera for another exposure.

The present invention may be more easily understood by reference to the accompanying drawing wherein:

FIG. 1 is a plan view of the camera shutter of the present invention with a portion of the cocking lever shown broken away; and FIGS. 2, 3, 4, and 5 are schematic representations of the double exposure prevention device of the present invention showing sequential positions of the retractable blade and the plate member during manipulation of the camera shutter.

Referring to FIG. 1, a base 1 is provided having an aperture 2 for passing light to a film-exposing chamber within a camera (not shown). A shutter blade 3 is rotatably mounted to the base 1 by means of a pin 4. The shutter blade 3 has an aperture 5 therethrough adapted to align with the base aperture 2 when the shutter blade 3 is rotated. A spring 6 urges the shutter blade 3 into the illustrated rest position. The shutter blade 3 is provided with a notch 7 adapted to accommodate the tooth 8 of a cocking member 9, which cocking member 9 is rotatably mounted on the base 1 and is urged into the illustrated rest position by the spring 10. Movement of the cocking member 9 in the direction shown by the arrow thereon causes the tooth 8 and the camming surface 11 to co-operate with the notch 7 and a bearing surface 12, respectively, to urge the shutter blade 3 to rotate against the action of the spring 6. As the shutter blade 3 is so rotated, a biasing member 13 of the shutter blade urges a leaf-spring 14 away from its normal or rest position and thereby moves an electrical contact 15 carried on leaf-spring 14 further away from a second electrical contact 16 which is borne by a second leaf-spring 17, both of which leaf-springs are cantilever mounted to the base 1.

Continued movement of the cocking lever 9 causes the shoulder 18 of the shutter blade 3 to escape from the escapement edge 19 of the cocking lever 9. The shutter blade 3 escapes to its illustrated rest position under the force of the spring 6, permitting light to enter the camera when the apertures 2 and 5 are temporarily aligned. Simultaneously, leaf-spring 14 rebounds and carried electrical contact 15 into engagement with the electrical contact 16, which has been moved from its rest position by engagement of the tooth 8 with the leaf-spring 17. Engagement of the two contacts 15 and 16 closes a flashbulb energizing circuit (not shown).

Figure 4:
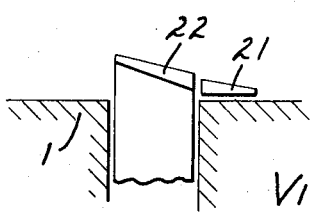

To prevent double exposures, a retractable blade 22 having a lower camming surface 24 is provided adjacent the base 1 and is operatively coupled to a camera mechanism (not illustrated) so that the retractably blade 22 is retracted towards the base 1 as the camera is prepared for an exposure (e.g., as a fresh section of film is advanced into the exposure chamber of the camera). The cocking lever 9 is provided with an extension 20 terminating in a plate member 21 adapted to step over the retractable blade 22 during cocking of the shutter blade 3, as shown by the dashed figures 21 in FIG. 2. As the cocking lever 9 returns to its rest position under the influence of spring 10, the plate member 21 passes between the base 1 and the retractable blade member 22, engaging the lower camming surface 24 and camming the retractable blade member away from the base, as sown in FIG. 3. In this position, the retractable blade member 22 obstructs movement of the plate member 21 thereover as shown in FIG. 4, until the retractable blade is retracted towards the base upon preparation of the camera for another exposure, thereby preventing double exposures.

Figure 5:
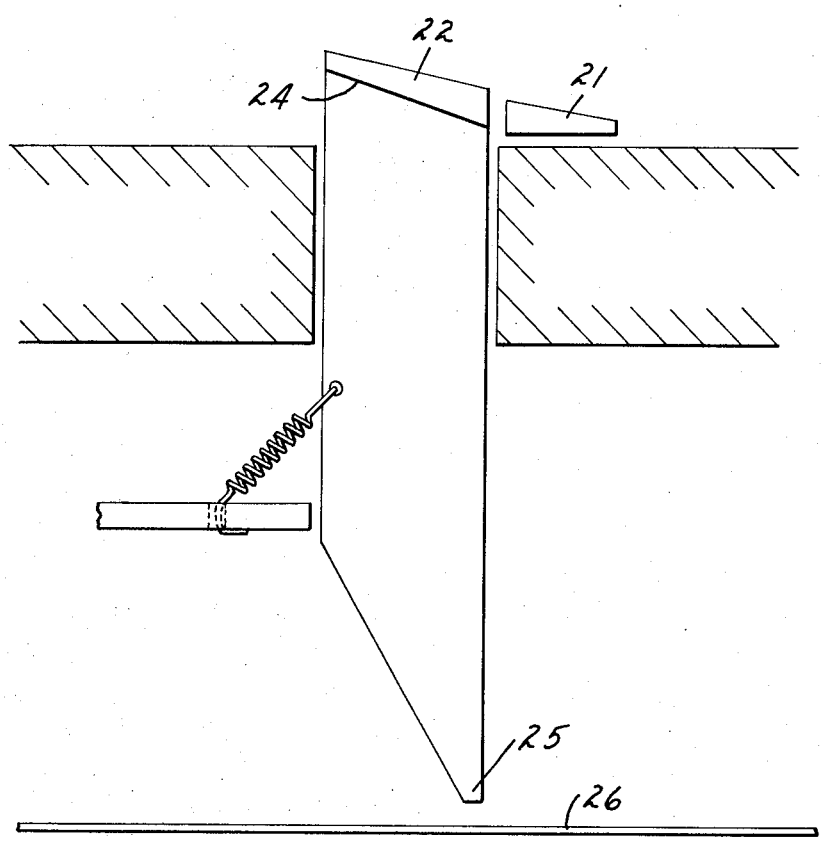

In a preferred embodiment of the present invention, as shown in FIG. 5, the retractable blade member 22 is operatively coupled to a film-sensing finger 25 which is biased against the film 26 in line with the path traveled by film perforations as the film is drawn through a camera. Upon encountering a perforation in the film, the film-sensing finger enters the perforation and stops further movement of the film. When the retractable blade member 22 is cammed away from the base 1 upon return of the cocking lever 9 to its illustrated rest position, the film-sensing finger operatively coupled thereto is withdrawn from the film perforation to permit another section of film to be advanced through the camera, the film-sensing finger thereby entering another perforation which causes the retractable blade 22 to be retracted towards the base 1.

Although the invention has been described with reference to a preferred embodiment thereof, modifications thereto may readily be made which fall within the scope of the present invention. It is contemplated, for example, that only one of the electrical contacts need be mounted on recoil means, such as the leaf-spring 14, engagable by the biasing member of the shutter blade. The recoil means may be a rigid member movably mounted on the base and equipped with spring means, such as a helical spring, to cause the rigid member to spring back upon disengagement therefrom of the shutter biasing member. The other of the electrical contacts may be rigidly mounted, for example, to the base or to the cocking lever.

We claim:

1. In a camera adapted to expose photographic film,
  a camera shutter having a base with an aperture therethrough, a shutter blade rotatably mounted thereon and adapted to momentarily uncover said aperture when rotated to thereby permit exposure of film in said camera, and a cocking lever having a cocking position and a rest position and which is rotatably mounted to said base and adapted to cock and release said shutter blade, said camera shutter being characterized by
  a double exposure prevention device comprising
    1. a retractable blade adjacent said base and adapted to undergo retraction towards said base when said camera is prepared for a film exposure, said retractably blade having a retracted position and an unretracted position and having a lower camming surface adjacent said base and an upper surface; and
    2. a plate member operatively coupled to and movable with said cocking lever to engage said retractable blade when said cocking lever is rotated such that as said cocking lever is moved from said rest position towards said cocking position, said plate member steps over said upper surface of said retractable blade when said retractable blade is in said retracted position and is blocked by said retractable blade from stepping over said upper surface thereof when said retractable blade is in said unretracted position, said plate member being adapted to engage said lower camming surface of said retractable blade when said cocking lever is returned from said cocking position to said rest position to cam said retractable blade from said retracted position to said unretracted position, thereby preventing said plate member from stepping over said retractable blade when subsequent cocking of said shutter blade is attempted before preparation of said camera for another exposure.

2. The camera of claim 1 adapted for use with perforated film wherein said double exposure prevention device additionally comprises a film-sensing finger adapted to enter a perforation in said film to stop further film advancement when an unexposed section of film has been advanced for exposure, said film-sensing finger being operatively coupled to said retractable blade such that entrance of said film-sensing finger into said perforation retracts said retractable blade towards said base and such that when said retractable blade is cammed away from said base by return of said cocking lever to said rest position, said film-sensing finger is withdrawn from said perforation to permit the advancement of the next unexposed section of film for exposure.

* * * * *